March 6, 1934.  F. S. BARKS  1,950,158
LUBRICATING APPARATUS
Filed May 6, 1931  3 Sheets-Sheet 1
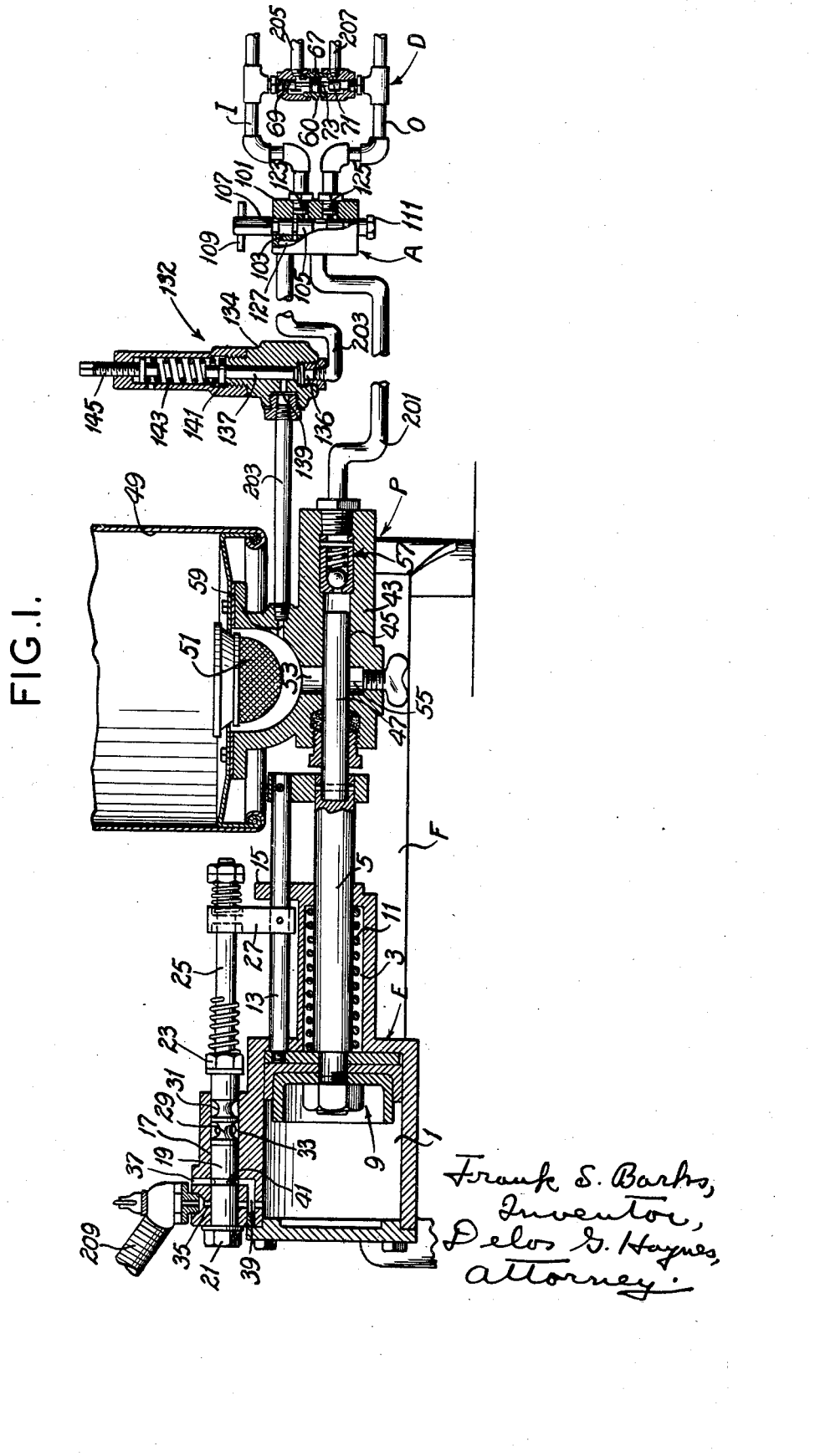

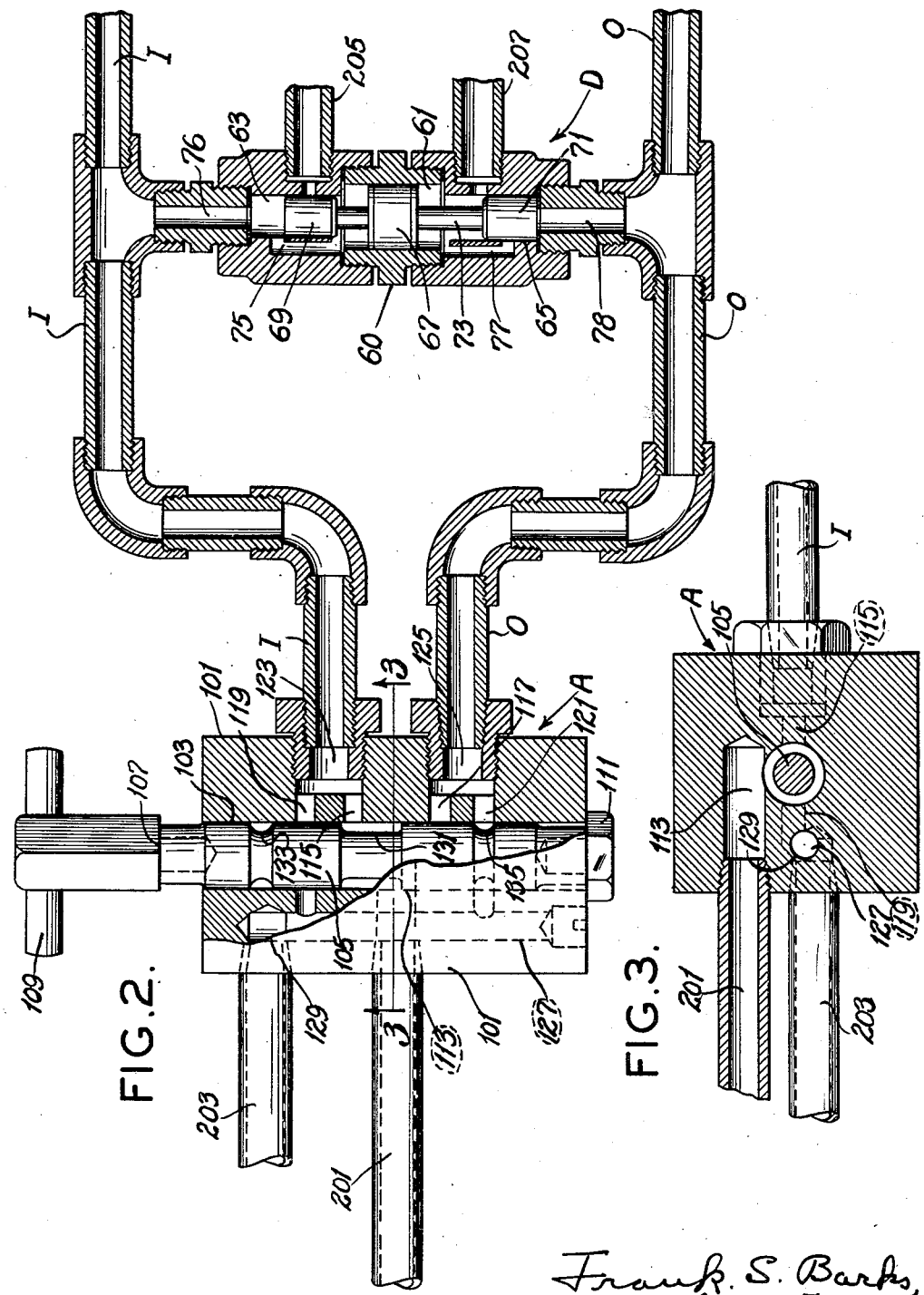

March 6, 1934.   F. S. BARKS   1,950,158
LUBRICATING APPARATUS
Filed May 6, 1931   3 Sheets-Sheet 3

Patented Mar. 6, 1934

1,950,158

UNITED STATES PATENT OFFICE 1,950,158

LUBRICATING APPARATUS

Frank S. Barks, St. Louis, Mo., assignor to Lincoln Engineering Company, St. Louis, Mo., a corporation of Missouri Application May 6, 1931, Serial No. 535,466

8 Claims. (Cl. 184—7)

This invention relates to fluid directing means, and with regard to certain more specific features, means for directing alternately to several conduits fluid such as grease.

This invention is a modification of the fluid-directing means described in my United States Patent 1,805,303 issued May 12, 1931, and is applicable where measured but non-automatic lubrication is especially desired.

Among the several objects of the invention may be noted a fluid directing means which is manually operable; the provision of a means of the class described which is adapted, in cooperation with the measuring device described in my said United States patent, to deliver definitely measured charges of lubricant to bearings and the like; the provision of a fluid directing means of the class described which is greatly simplified, readily operable, and easy to manufacture; and, the provision of a lubricating system using means of the class described, said system also having means adapted to maintain pressure in certain lines which would otherwise exhaust to a pressure much lower, whereby the operating efficiency of said system is substantially raised. Other objects will be in part obvious and in part pointed out hereinafter.

The invention accordingly comprises the elements and combinations of elements, features of construction and arrangements of parts which will be exemplified in the structure hereinafter described, and the scope of the application which will be indicated in the following claims.

In the accompanying drawings, in which is illustrated one of various possible embodiments of the invention, Fig. 1 is a view showing the fluid directing means of the invention partly in section and connected in a lubricating system comprising an engine E, a pump P shown in vertical section and a distributor D shown in horizontal section.

Fig. 2 is an enlarged horizontal partial sectional view of the directing means and distributor of Fig. 1;

Fig. 3 is a cross section taken on line 3—3 of Fig. 2; and,

Similar reference characters indicate corresponding parts throughout the several views of the drawings.

Figure 4:
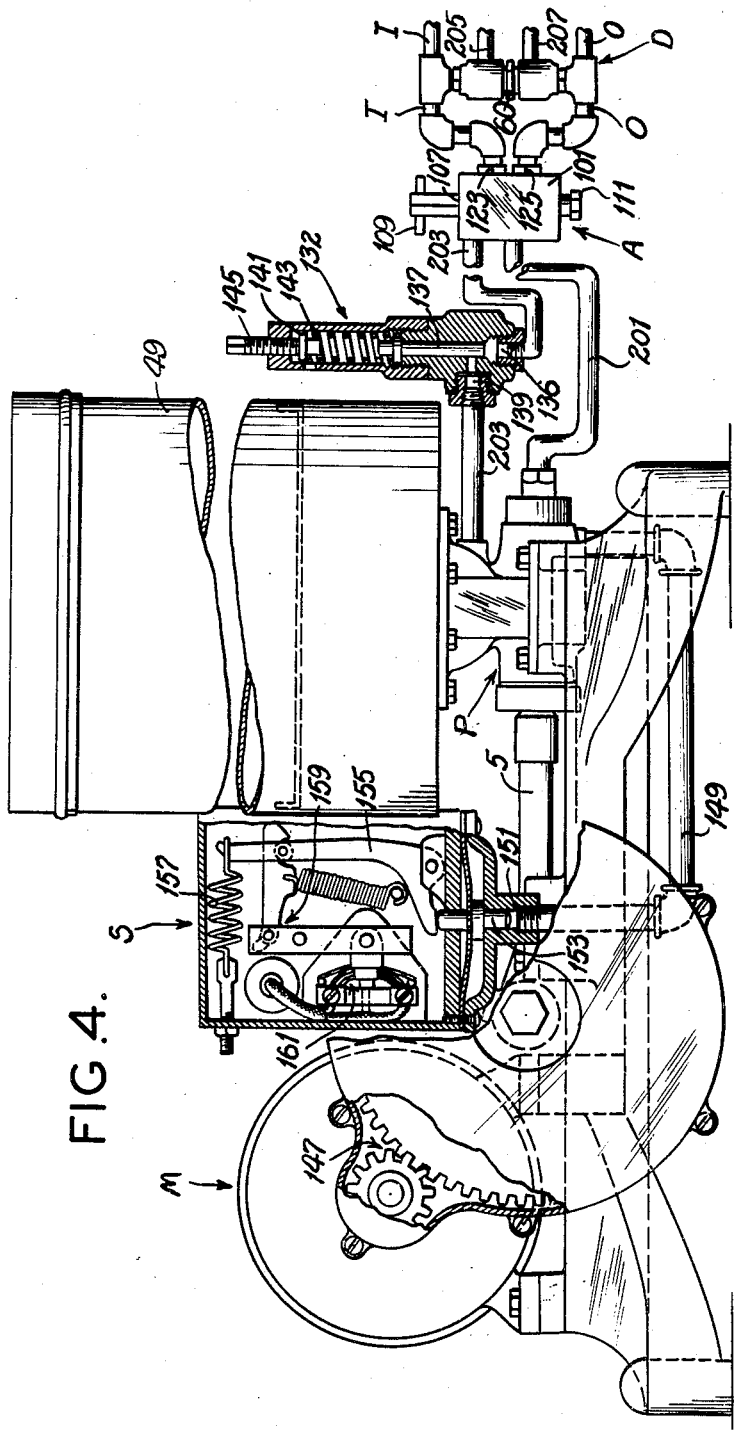
Fig. 4 is a view showing a system similar to that of Fig. 1 but showing an electric motor M adapted to operate the pump P.

Referring now more particularly to Fig. 1, there is shown at index E an air engine adapted to operate a pump P which is adapted to maintain a predetermined maximum pressure in a main fluid pressure inlet line 201, which terminates at a fluid pressure directing means or alternator A. The alternator A distributes the fluid pressure from the line 201 into either of two main fluid pressure outlet lines I or O across which are connected lubricating distributors D which are adapted to deliver grease or fluid to bearings or the like through secondary outlet lines 205 and 207. The engine and pump E and P are mounted on a frame F. It is understood that the alternator A may also be mounted on the frame F as a single unit with the pump P. As shown in the drawings, however, the fluid directing means A is separated from the pump P.

The particular types of engine E and pump P shown in Fig. 1, are shown as class examples only, and it is to be understood that any suitable type may be used with the fluid directing means A. It is preferable that the type used be adapted to maintain the proper pressure in the lines 201. A detailed description of the pump P and engine E, shown in Fig. 1 is contained in my United States Patent 1,633,304, issued June 21, 1927. A brief description of the apparatus and operation of the apparatus shown at indicia E and D is for convenience given as follows:

The air engine E comprises a work cylinder shown at 1, and a spring retaining cylinder 3, aligned with the center line of the cylinder 1. A piston rod 5 passes through the cylinder 3, and into the cylinder 1. The rod 5 is provided at its rear end with a driving piston 9. This piston 9 is normally held at the rear end of the cylinder 1 by means of a spring 11 reacting against said piston and the front of the cylinder 3. A driving stem 13 for the valve gear of the engine E is suitably supported by and moves with the piston rod 5. The rod 13 is guided by a passage in the head of the cylinder 1 and by passage through an ear 15 extending from the front end of the cylinder 3.

An extension above the work cylinder 1 is provided with a longitudinal bore 17 for slidably receiving a valve 19 which carries positive movement limiting heads 21 and 23. A driving bracket 27, vertically mounted on the driving rod 13, slidably engages a valve stem 25 extending from the valve 19. Springs are positioned at either side of the bracket 27 and on the stem 25 to enhance rapid shifting of the valve 19. It is thus seen that the valve 19 is positioned in its alternate positions by means of the piston rod 5. Peripherally depressed portions 29 and 31 in the valve 19 cooperate with a spring operated detent to prevent the valve from assuming said positions before the piston rod 5 completes its strokes.

Vertically drilled passages 35 and 37 serving inlet and exhaust purposes respectively, are adapted to be connected with a common bore 39 by means of a peripheral groove 41 in the valve 19. A compressed gas line 209 is connected with the inlet 35. The outlet 37 exhausts to the atmosphere.

The pump P comprises a body portion 43 having a central longitudinal bore 45 whose center line is substantially aligned with the center line of the cylinders 3 and 1. A plunger 47 connected to the piston rod 5 is reciprocated by said piston rod 5.

A fluid or lubricant container 49 positioned above the pump P but integral therewith, delivers grease through a strainer 51, to a passage 53, and to a peripheral passage 55 which surrounds the bore 45. A check valve 57, located at the outlet of the bore 45, prevents flow of fluid from the line 201 back into the bore 45 but allows flow of fluid from the bore 45 through the valve 57, to the line 201. It is thus seen that as the plunger 47 recedes back of the passage 55, the vacuum created in the bore 45 by the recession draws fluid from the container 49 through the strainer 51, the passage 53 and through the peripheral passage 55 into the bore 45 whereby the bore is filled with grease. A forward motion of the plunger 47 now forces the grease sucked into the bore 45, out through the check valve 57 into the line 201.

The operation of the combination of the engine E and pump P is as follows:

As shown in Fig. 1, the piston rod 5 and the plunger 47 have just completed a compression stroke, and the valve 19 has been moved to the right and to its exhausting position by means of the bracket 27 operated by the rod 5. The compressed spring 11 now pushes the piston rod 5, and the piston 9 to the rear of the cylinder 1. As the piston 9 thus moves, the air in the cylinder 1 is exhausted through the passages 39, 41, and 37. Furthermore, as the piston rod 5 moves the bracket 27 it operates the stem 25 and moves the valve 19 to its compression position just as the piston 9 reaches the end of the cylinder, whereupon the valve 19 allows the compressed air from the line 209 to enter the cylinder 1 by way of the passages 35, 41 and 39. This pressure acting on the face of the piston 9 pushes the piston 9 and the piston rod 5 to the front of the cylinder 1, whereby the plunger 47 compresses the fluid which has been drawn into the bore 45 by the vacuum created during the receding stroke of the plunger 47. Thus the grease is forced out through the check valve 57 into the line 201.

A passage 59 communicating with the passage 53, is connected with an exhaust line 203 which will be described hereinafter.

It is pointed out that a considerable mechanical advantage is obtained between the plunger 47 and the piston 9 in that the area of the piston face is much greater than the area of the end of the plunger 47 and that the pressure exerted by the plunger 47 on the grease in the bore 45 equals the pressure of the gas in the line 209, multiplied by the ratio of the area of the face of the piston 9 to the area of the end of the plunger 47.

The distributor or metering device D is described in detail in my said United States Patent 1,805,303. A brief description of the distributor D is sufficient for the purpose of describing the operation of the invention. The distributor D is adapted to distribute fluid pressure from the lines I and O to outlets 207 and 205 respectively. The lines 205 and 207 may be connected with bearings or the like which are lubricated by the system. Any number of distributors D may be located in parallel between the lines I and O and the size of the distributors preferably varies with the needs of the bearings being lubricated. The distributor D comprises a body portion 60 having concentric bores 61, 63 and 65 which respectively are provided with a main piston 67, and piston heads 69 and 71 of a valve stem 73. The piston 67, piston heads 69 and 71, and the stem 73 are adapted to move freely within the bores 61, 63 and 65.

The cylinders 63 and 65 are provided with inlets 76 and 78 which are connected with the main fluid outlet lines I and O. The secondary outlet lines 205 and 207 are also respectively connected with the bores or cylinders 63 and 65, and are prevented from direct communication with the inlets by the piston heads 69 and 71. By-passes 75 and 77 are provided to connect the inlets 76 and 78 with the inner bore 61. The piston heads are adapted to operate by a pressure difference which exists between the lines I and O, and are adapted to alternately cover and uncover opposing sets of by-passes and outlets as shown.

Referring now to Fig. 2 the alternator A is adapted to direct the fluid pressure in the main fluid pressure inlet line 201 alternately between the two main fluid pressure outlet lines I and O. The alternator A comprises a body portion 101 having a bore 103 in which is slidably mounted a valve 105, which has movement limiting stops 111, and 107, the latter forming a support for a handle 109. Thus the valve 105 is slidable back and forth to the right and to the left and vice versa in the bore 103 by means of the handle 109.

An inlet 113 is connected with the main-pressure inlet line 201 at the bore 103 as shown more clearly in Fig. 3. The main fluid outlets 123 and 125 are connected with the bore 103 by means of exhaust passages 119 and 121, and outlet passages 115 and 117 respectively. Continuations of the passages 119 and 121 connect the bore 103 with a passage 127 which is tapped by an exhaust outlet 129 connected with the exhaust line 203.

The valve 105 has a central peripheral depression 131 adapted to connect the inlet 113 respectively with the outlet passages 115 and 117 as shown respectively in Figs. 2 and 1. The valve 105 also has peripheral depressions or grooves 133 and 135 adapted, when the valve 105 is properly positioned, to respectively connect the passages 119 and 121 with passage 127.

It is to be understood that the valve stem 105 may be of other suitable type and is not limited to the form shown in the drawings.

When the inlet 113 is connected with one of the lines I or O by the outlet passage 115 or 117 the adjacent exhaust passage is closed by the valve 105, and at the same time the other outlet passage to the lines I or O is closed, and its adjacent exhaust passage is open. Thus when, as shown in Fig. 2, pressure is being communicated from the line 201 to the line I by way of the inlet 113, the peripheral depression 131, the inlet passage 115 and passage 123, the line O is at the same time in communication with the line 203 by way of the passage 125, 121, peripheral depression 135, passages 121, 127 and 129. The passages 119 and 117 are at this time cut off by the valve.

A pressure relief valve 132 is inserted in the exhaust line 203 and is adapted to keep the pressure in the portion of the line 203 adjacent the alternator A at a pressure substantially higher than that existing in the remainder of line 203, and consequently in the grease or fluid container 49. The relief valve 132 comprises a body portion 134 having a bore 136 formed therein which is adapted to slidably receive a valve stem 137. As shown in the drawings, the lower end of the bore 136 is in communication with the line 203 adjacent the alternator A, and a passage 139, which is connected with the line 203 adjacent the pump P, taps the bore 136 as shown. When the stem 137 is in its lowermost position, as limited by a collar 141, communication between the adjacent ends of the line 203 is cut off inasmuch as the passage 139 is not in communication with the bore 136.

A spring 143 reacting against the collar 141 and against an adjustable screw and collar 145 resists the raising of the lower end of the stem 137 above the passage 139. However, when the pressure in the line 203 adjacent the alternator A is raised above a predetermined pressure, as determined by the pressure of the spring 143, and the area of the lower end of the stem 137, the stem 137 is forced up against the action of spring 143 and communication is established between the adjacent ends of the lines 203, and the exhaust port 127 of the alternator A is allowed to exhaust into the container 49. In this way pressure in the exhaust line 203 adjacent the alternator A and in the line I or O not receiving pressure may be maintained at a pressure which is preferably only slightly lower than that existing in the main pressure line 201, and in the line I or O in communication with the line 201. For instance, if the compressor or pump P is capable of maintaining a pressure of 5,000 pounds per square inch in the line 201, the release valve 132 may be set by adjusting the spring 143 with the screw 145 to maintain a pressure of, for instance, 4,000 pounds per square inch in part of the line 203 which is adjacent the alternator A. Thus the pressure in the main fluid pressure outlet line I or O which is not in communication with the line 201 is not dropped down to atmospheric pressure, and consequently when the pressure between the lines I and O is changed, it is not necessary to bring the pressure in the relatively low pressure line from atmospheric pressure to the 5,000 pounds per square inch. The importance of this advantage will be described hereinafter.

Referring now to Fig. 1 again, the description of the operation of the system as a whole is as follows:

Assuming the piston 105 of the alternator A to be in a position shown in Fig. 1, pressure from the bore 45 is being delivered through the valve 57, the pressure line 201, the inlet 113, the depressed portion 131, the passages 117 and 125 to the line O, where it has pushed the valve head 71 to its left hand position, (the pressure in the line I being lower than that in the line O), and is communicating with the main piston 67, by way of the bore 65, and by-pass 77 to force fluid from the outlet 205. As further shown in Fig. 1, the plunger 47 has just completed its stroke, and is now set to return by means of the spring 11, to start another stroke.

The plunger 47 will continue its reciprocation and delivery of fluid from the pump supply container 49 to the line 201, and consequently to the pistons 67 until the pistons 67 reach the ends of their strokes at which point the flow of fluid in the lines I and O will completely stop. It is to be understood that the plunger 47 continues its reciprocation, however, until all of the pistons 67, of the plurality of distributors D between the lines I and O, have reached the ends of their strokes. The piston 9, driven by the compressed air will also stop when the flow of fluid stops which results in the building up of pressure in the line 201 to equal that exerted by the piston 9 on the fluid in the bore 45 by the plunger 47.

In the event that a passage or outlet 205 becomes stopped or blocked at its bearing the corresponding piston 67 may not have finished its stroke in the bore 61 when the pressure in the line O is sufficient to stop the piston 9 and consequently that piston 67 will not finish its stroke. Normally, however, this pressure is not created until all of the pistons 67 have reached the ends of their strokes.

Thus, with this setting of the piston or valve 105, measured charges of fluid are delivered from all of the distributors D, to all of the lines 205. This results because with each stroke of a piston 67 of a distributor D, a measured charge of fluid is ejected to the corresponding outlet line. It is pointed out that the volume of the charge thus delivered may be changed by changing the length of the main piston 67 and/or by changing the diameter of the bore 61. Furthermore, the bearings in communication with the outlets 205 in the event of being plugged, will receive the full pressure which is delivered by compressed air from the line 209 to the plunger 47, the unit pressure of grease and air being inversely as the areas of the pistons 47 and 9 as modified by friction.

The movement of the valve 105 to the position just described effected the shifting of the valve head 71 to the left, by changing the pressure difference between the lines I and O. Thus the valve head 69 operating in the bore 63 forces fluid in the bore 63 into the line I. The pressure in the exhaust line 203, put into communication with the line I by the positioning of the valve 105 to that as shown in Fig. 1, is not dropped to atmospheric pressure but is dropped to the hereinbefore described pressure only slightly below that in the lines O and 201 and is thus maintained by the release valve 132. The difference in pressure, however, between the lines O and I, is sufficient to cause the movement of the valve head 71 to the left, and to force the grease in the bore 63 through the line I, the passage 119, the depression 133, the passage 127, and the line 203 and to force the stem 137 up against the reaction of the spring 143, whereby an exhaust into the container 49 is effected.

To now grease the bearings in communication with the lines 207 the operator manually pulls the handle 109 out and the valve 105 is moved to its alternative position shown in Fig. 2. This movement of the valve 105 closes the communication between the inlet 113 and the line O, opens communication with the line O and the return line 203, and between the line 201, and the line I and closes communication between the line I and the return line 203. The pressure on line 201 thus delivered to the line I is communicated to the valve head 69. Furthermore, the pressure now existing in the line O is slightly lower than that which exists in the line I inasmuch as the communications between the line O and the return line 203 has been established, and the excess pressure in the line O, which the release valve 132 is incapable of maintaining, has been exhausted to the container 49. Under the pressure difference thus established between the lines I and O the valve head 69 is moved to the right. This shifting to the right exhausts the fluid which is in the bore 65 into the lines O, and 203, raises the plunger 130 which allows the exhausting of the line O into the container 49 until the predetermined pressure is reached at which point the valve 132 prevents further exhausting. The pressure in the line I is transmitted to the piston 67 by way of the cylinder 63, and the by-pass 75, and grease in the bore 61, on the other side of the piston 67 is delivered to the bearing in communication with the line 207.

As described in connection with the alternate position of the valve 105, the plunger 47 continues to reciprocate until the pressure on the line I is built up equal to as many times that of the pressure exerted by the compressed air against the piston 9 as determined by the area ratio between pistons 9 and 47.

It is thus seen that by the manual operation of the valve handle 109, independent of time, a measured charge of grease is delivered to all of the outlets 205 or 207, as the case may be, of the distributors D between the lines I and O. In the prior devices the pressure in the lines I and O was alternated by means of an automatic alternator which always delivered a predetermined maximum pressure to the distributors D, and was of an advantage in certain applications of lubricating systems. However, the structure in the present application has the advantage that closer control is had over the amount of charge delivered to the bearings and their control is independent of the time element, provided that sufficient time is allowed for all of the pistons 67 to finish their strokes.

In the present invention the handle 109 may be operated and the valve 105 put in one of its position and then left in that position with the assurance that the system will give a definite charge to all of the bearings connected with the particular one of the lines 205 and 207 then effective, which line will then stop working. There is no danger of over lubricating or waste, even though the instigator of the operation pays no further heed to the device after setting the handle 109.

It is to be understood that the engine E may be surplanted by an electric motor controlled by a pressure cut-out switch which would stop reciprocation of the plunger 47 after a predetermined maximum pressure in the line 201 was reached. Such a structure is shown in Fig. 4 and the lubricating system is the same except that an electric motor M has been substituted for the air engine E. Similar reference characters indicate parts corresponding to those shown in Figs. 1 and 2. The motor M drives the piston rod 5 which operates the pump P through a reduction gear train 147. A pressure cut-out switch S is adapted to control the operation of the motor M. A line 149 connects the switch S with the bore 45 just before the check valve 57. The line 149 is connected with the switch S as shown at numeral 151. The pressure in the line 149 acts on a plunger 153, which is adapted to operate a bell crank arm 155 against the action of an adjustable spring 157. The bell and crank through an overcentering mechanism 159, operates a switch 161, which switch controls the supply of electricity to the motor M. When the plunger 153, driven up by the pressure in the line 149, overcomes the action of the spring 157 it moves the bell crank lever 155, and throws the mechanism 159 to break the contact of the switch 161 whereby the motor M stops the reciprocation of the plunger 47. Likewise, when pressure in the line 149 drops, the bell crank lever 155 moves forward under the action of the spring 157, closes the contact of the switch 161, and the motor M again starts the reciprocation of the plunger 47 in the bore 45 to again build up the pressure in the bore 45 to the predetermined maximum pressure which is desired and which is adjustable by the spring 157.

It is thus seen that the switch S in combination with the motor M operates in a way which is similar to that in which the air engine E operates. That is, in the case of the air engine, when the pressure in the line 201 reaches the pressure of the compressed air multiplied by the ratio of the areas of the pistons 9 and 47 the operation of the engine E discontinues, and in the case of the motor M, a predetermined pressure in the line 201 prevents a continued operation of the motor M, by operating the switch S, which shuts off the motor M.

The use of the motor M is advantageous in instances where compressed air is not conveniently available for the operation of an air engine E. Furthermore, the motor M eliminates the necessity of a compressed air system which is relatively bulky and expensive.

It is also possible to substitute a hand operated compressor for the engine E. In all instances however, that is, with the air engine E, the motor M, or the hand operated compressor, only a measured amount of grease is delivered to the respective outlet lines 205 and 207 for a given position of the alternator or directing means A.

Another advantage offered by the system, in addition to those which are obtained by the use of the hand operated alternator A is that the pressure release valve 132 in the exhaust line 203 eliminates the great pressure drop in the exhaust line 203 and in the line I or O not receiving the pressure from the line 201. Formerly, in the operation of such a lubricating system, the pressure in the line I or O not receiving the high pressure was dropped to atmospheric pressure or to the pressure of the container 49, and consequently when the direction of the fluid pressure was changed, it was necessary for the pump P to build up the pressure in the line from atmospheric to, for instance, 5,000 pounds per square inch. If there were any gas bubbles in the fluid being pumped, or if the fluid itself were inherently of a resilient nature, it was necessary each time to compress the air and the fluid before such a pressure could be reached. Furthermore, the lines I, O and 201 expand with the high pressure and fluid had to be pumped each time to fill the expanded pipes. Thus it was necessary to either (1) provide a pump P of a relatively large capacity or (2) cut down the size of the piping used (which meant increasing the friction loss in the system) and/or (3) shorten the lines I and O that which meant putting in additional lubricating system. Thus by keeping the pressure in the exhaust line 203 considerably above the atmospheric pressure and only slightly below the predetermined maximum pressure which exists in the line 201, I am able to accomplish several advantages among which are (1) reduction in the size of the pump P, (2) further extension of the lines I and O, because larger piping can be used, whereby the friction loss in the system is reduced, and (3) the obtaining of a more immediate action in the lubricating system, inasmuch as only very few strokes of the plunger 47 are necessary for raising the pressure in the lines. A further advantage is the operating efficiency of the system has been substantially increased.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, lubricant conduit lines, delivery means for ejecting lubricant from said lines, means for supplying said lubricant alternately to said lines to effect ejection of said fluid from said delivery means, a supply means comprising a pump supply, a pump, a connection from the pump to the alternating means, and an exhaust line between said alternating means and the pump and means in said exhaust line adapted to maintain the exhaust pressure above that of the pump supply.

2. In apparatus of the class described, a pump, lubricant conduit lines, means for directing and redirecting lubricant under pressure from said pump to said lines, an exhaust line connecting the directing means to a supply of said pump, means for ejecting fluid from said lines to points to be lubricated, means for maintaining pressure in said exhaust and lines associated therewith which is higher than the pressure on the pump supply, and means for automatically controlling said pump according to the pressure in the delivery line therefrom.

3. In apparatus of the class described, a pump, lubricant conduit lines, means for directing and redirecting lubricant under pressure from said pump to said lines, an exhaust line connecting the directing means to a supply of said pump, means for ejecting fluid from said lines to points to be lubricated, means for maintaining pressure in said exhaust line and lines associated therewith which is higher than the pressure on the pump supply, and means for automatically controlling said pump according to pressure in the delivery line therefrom, the pressure in said exhaust and in the pump delivery line being independently maintainable.

4. In apparatus of the class described, a pump, lubricant conduit lines, means for directing and redirecting lubricant under pressure from said pump to said lines, an exhaust line connecting the directing means to a supply of said pump, means for ejecting fluid from said lines to points to be lubricated, means for maintaining pressure in said exhaust line and lines associated therewith which is higher than the pressure on the pump supply, and means for automatically controlling said pump according to the pressure in the delivery line therefrom, the pressures in said exhaust and in said pump delivery lines being independently maintainable, and means for independently adjusting said independently maintainable pressures.

5. In apparatus of the class described, a pump, lubricant conduit lines, means for directing and redirecting lubricant under pressure from said pump to said lines, an exhaust line connecting the directing means to a supply of said pump, means for ejecting fluid from said lines to points to be lubricated, means for maintaining a pressure in said exhaust and lines associated therewith which is higher than the pressure on the pump supply, and means for automatically controlling said pump according to pressure in the delivery line therefrom, the pressures in said exhaust and pump delivery lines being independently maintainable, said means for maintaining the independent pressure in the delivery line comprising electric motivating means, and a pressure cut-out switch therefore, said switch being operable by the pressure in said delivery line.

6. In apparatus of the class described, a pump, lubricant conduit lines, means for directing and redirecting lubricant under pressure from said pump to said lines, an exhaust line connecting in the directing means to the supply of said pump, means for ejecting fluid from said lines to points to be lubricated, means for maintaining pressure in said exhaust and lines associated therewith which is higher than the pressure on the pump supply, and means for automatically controlling said pump according to the pressure in the delivery line therefrom, the pressures in said exhaust and in pump delivery lines being independently maintainable, said means for maintaining pressure in the delivery lines comprising an air-operated engine adapted to operate said pump.

7. In apparatus of the class described, an exhaust line, fluid conduit lines, automatic delivery means associated with said lines for delivering a fluid alternately to a plurality of points, a pump for placing fluid under pressure, means for directing said fluid under pressure alternately to said lines to effect alternation of the action of said delivery means, means associated with said directing means to connect with the exhaust line the conduit line not receiving pressure, a pump supply, said exhaust line being in communication with the supply, and means in the exhaust line for maintaining the pressure therein above that of the supply.

8. In apparatus of the class described, an exhaust line, fluid conduit lines, automatic delivery means associated with said lines for delivering a fluid alternately to a plurality of points, a pump for placing fluid under pressure, manually operable means for directing said fluid under pressure alternately to said lines to effect alternation of the action of said delivery means, means associated with said manual means to connect the conduit line not receiving pressure with the exhaust line, a pump supply, said exhaust line being in communication with the supply, and adjustable means in the exhaust line for maintaining the pressure therein above that of the supply.

FRANK S. BARKS.